(12) United States Patent
Zaetterqvist (10) Patent No.: US 10,683,092 B2
(45) Date of Patent: *Jun. 16, 2020

(54) MAGAZINE AND METHOD FOR LAUNCHING COUNTERMEASURES

(71) Applicant: SAAB AB, Linkoeping (SE)

(72) Inventor: Christer Zaetterqvist, Upssala (SE)

(73) Assignee: SAAB AB, Linkoeping (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/301,305

(22) PCT Filed: May 5, 2017

(86) PCT No.: PCT/SE2017/050436
§ 371 (c)(1),
(2) Date: Nov. 13, 2018

(87) PCT Pub. No.: WO2017/200454
PCT Pub. Date: Nov. 23, 2017

(65) Prior Publication Data
US 2019/0193857 A1    Jun. 27, 2019

(30) Foreign Application Priority Data

May 17, 2016   (SE) ...................................... 1650665
Nov. 8, 2016   (SE) ...................................... 1651463

(51) Int. Cl.
*F41A 27/00*   (2006.01)
*B64D 7/06*   (2006.01)
(Continued)

(52) U.S. Cl.
CPC ................. *B64D 7/06* (2013.01); *B64D 1/02* (2013.01); *B64D 7/00* (2013.01); *F41A 17/38* (2013.01);
(Continued)

(58) Field of Classification Search
CPC . F42B 5/15; F42B 12/70; F41H 11/02; B64D 1/02; B64D 7/00; F41A 27/08
(Continued)

(56) References Cited

U.S. PATENT DOCUMENTS 2,391,956 A   1/1946  Eastman
2,467,514 A   4/1949  Woodman
(Continued)

FOREIGN PATENT DOCUMENTS

DE   3902624 A1   8/1990
EP   0253028 B1   8/1990
(Continued)

OTHER PUBLICATIONS

Extended European Search Report for European Patent Application No. 17799758.2, (6 pages), European Patent Office, Munich, Germany.
(Continued)

*Primary Examiner* — Michael D David
(74) *Attorney, Agent, or Firm* — Alston & Bird LLP (57) ABSTRACT

A magazine for storing and launching countermeasures arranged in cartridges, comprising a plurality of longitudinal cartridge cases forming the magazine, where each cartridge case comprises side walls and a front opening and a centre axis, where the magazine is adapted to be mounted on an aircraft, where the side walls of two adjacent cartridge cases are arranged to each other in a slidable manner in a longitudinal direction, and where the magazine comprises a tilting means adapted to tilt the cartridge cases, such that the openings of the cartridge cases can be directed in a selected direction. The advantage of the invention is that a countermeasure can be directed in a desired angle before it is launched.

15 Claims, 6 Drawing Sheets

(51) Int. Cl.
    *F41H 11/02*     (2006.01)
    *B64D 7/00*     (2006.01)
    *B64D 1/02*     (2006.01)
    *F41F 1/06*     (2006.01)
    *F41F 1/08*     (2006.01)
    *F41A 17/38*     (2006.01)

(52) U.S. Cl.
    CPC ............... *F41F 1/06* (2013.01); *F41F 1/08* (2013.01); *F41H 11/02* (2013.01)

(58) Field of Classification Search
    USPC ........... 89/37.16–37.22, 37.01, 37.02, 41.14; 102/505
    See application file for complete search history.

(56) References Cited

U.S. PATENT DOCUMENTS

| | | | |
|---|---|---|---|
| 3,808,595 | A | 4/1974 | Coop et al. |
| 3,934,846 | A | 1/1976 | Maurer |
| 4,280,394 | A | 7/1981 | Singenberger et al. |
| 4,674,393 | A | 6/1987 | Schaulin et al. |
| 5,198,609 | A | 3/1993 | Gillman |
| 5,340,054 | A | 8/1994 | Smith et al. |
| 5,699,981 | A | 12/1997 | McGrath et al. |
| 6,098,925 | A | 8/2000 | Burdsall, II et al. |
| 6,231,002 | B1 | 5/2001 | Hibma et al. |
| 7,640,858 | B1 | 1/2010 | Herbage et al. |
| 10,495,424 | B2 * | 12/2019 | Zaetterqvist ............ F42B 12/64 |
| 2001/0015126 | A1 | 8/2001 | Grunewald |
| 2003/0117309 | A1 | 6/2003 | Pappert et al. |
| 2004/0104309 | A1 | 6/2004 | Segota et al. |
| 2005/0204910 | A1 | 9/2005 | Padan |
| 2010/0294119 | A1 | 11/2010 | Buechler et al. |
| 2010/0326262 | A1 | 12/2010 | Galanti et al. |
| 2011/0155856 | A1 | 6/2011 | Zachrisson |
| 2012/0125183 | A1 | 5/2012 | Zätterqvist |
| 2012/0210855 | A1 | 8/2012 | Clark et al. |
| 2016/0121996 | A1 | 5/2016 | Eveker et al. |
| 2019/0092469 | A1 | 3/2019 | Zaetterqvist |
| 2019/0137220 | A1 | 5/2019 | Zaetterqvist |
| 2019/0178613 | A1 | 6/2019 | Zaetterqvist |

FOREIGN PATENT DOCUMENTS

| | | | |
|---|---|---|---|
| EP | 1247735 | A3 | 1/2004 |
| EP | 1194331 | B1 | 5/2004 |
| EP | 2157398 | A2 | 2/2010 |
| EP | 2157398 | A3 | 7/2012 |
| EP | 2279119 | B1 | 12/2015 |
| EP | 2421754 | B1 | 10/2016 |
| GB | 2410542 | A | 8/2005 |
| GB | 2505721 | A1 | 3/2014 |
| WO | WO-2010/123422 | A1 | 10/2010 |
| WO | WO 2010/123422 | A1 | 10/2010 |
| WO | WO-2014/140587 | A1 | 9/2014 |
| WO | WO-2015/072901 | A1 | 5/2015 |

OTHER PUBLICATIONS

International Searching Authority, International Search Report and Written Opinion for International Application No. PCT/SE2017/050436, dated Jul. 21, 2017, 12 pages, Swedish Patent and Registration Office, Sweden.

International Searching Authority, International Search Report and Written Opinion for International Application No. PCT/SE2017/050440, dated Jul. 21, 2017, 12 pages, Swedish Patent and Registration Office.

International Searching Authority, International Search Report and Written Opinion for International Application No. PCT/SE2017/050437, dated Jul. 21, 2017, 12 pages, Swedish Patent and Registration Office.

International Searching Authority, International Search Report and Written Opinion for International Application No. PCT/SE2017/050441, dated Jul. 21, 2017, 13 pages, Swedish Patent and Registration Office.

International Searching Authority, International Search Report and Written Opinion for International Application No. PCT/SE2017/050442, dated Aug. 4, 2017, 14 pages, Swedish Patent and Registration Office.

International Searching Authority, International Search Report and Written Opinion for International Application No. PCT/SE2017/050438, dated Jul. 27, 2017, (12 pages), Swedish Patent and Registration Office, Sweden.

Extended European Search Report for European Patent Application No. 17799760.8, dated Nov. 18, 2019, (8 pages), European Patent Office, Munich, Germany.

Extended European Search Report for European Patent Application No. 17799759.0, dated Nov. 21, 2019, (7 pages), European Patent Office, Munich, Germany.

Extended European Search Report for European Patent Application No. 17799763.2, dated Nov. 21, 2019, (7 pages), European Patent Office, Munich, Germany.

Extended European Search Report for European Patent Application No. 17799764.0, dated Nov. 26, 2019, (8 pages), European Patent Office, Munich, Germany.

* cited by examiner

MAGAZINE AND METHOD FOR LAUNCHING COUNTERMEASURES

CROSS REFERENCE TO RELATED APPLICATIONS

This application is a National State Application, filed under 35 U.S.C. & 371, of International Application No. PCT/SE2017/050436, filed May 5, 2017, which claims priority to Swedish Application No. 1650665-1, filed May 17, 2016, and Swedish Application No. 1651463-0, filed Nov. 8, 2016; the contents of all of which are hereby incorporated by reference in their entireties.

BACKGROUND

Related Field

The present invention relates to a variable magazine for storing and launching countermeasures, such as flares, chaff or grenades, where the firing direction of a countermeasure can be varied. The countermeasure is comprised in an active protection system, and may be of either a soft-kill or a hard-kill type.

Description of Related Art

Arrangements for storing and launching payloads, such as countermeasures, which are designed to be mounted on aircrafts, are previously known. One such arrangement is a dispenser mounted on an aeroplane, which comprises an elongate body provided with at least one launch opening. The shape of the dispenser may have other equivalent shapes, such as an elliptic or circular shape. However, an elongate body is an efficient shape. Such dispensers are mounted with the longitudinal direction of the elongate body essentially coinciding with the flight direction of the aeroplane. The countermeasures are connected to a firing control unit for feeding firing signals to the countermeasures. The countermeasures can consist of passive means, such as chaff foil, but can also consist of for example IR flares, or other active measures. The countermeasures are stored in one or more magazines, where a magazine comprises a plurality of cartridges, with one countermeasure in each cartridge.

One problem with known dispensers mounted on aircrafts is that the launch angle of a countermeasure is fixed to a set angle which is believed to be optimal for the intended use. Depending on the purpose of the countermeasure, it may be of advantage to use different firing directions. If chaff is released, a preferred launch direction may be upwards towards a helicopter, if flares are released, a preferred launch direction may be somewhat forwards and downwards. A dispenser mounted on an aeroplane may therefore be provided with several magazines, directed in different directions. A solution with a fixed launch angle may be a good solution for an aeroplane, which has a known flight direction and a known speed range.

For a helicopter, a fixed launch angle is however not optimal, since both flight angle, flight speed and the orientation of the aircraft may vary considerably. Helicopters may be provided with several magazines holding cartridges with countermeasures. Each magazine may be positioned at a predefined position and pointing in a predefined direction on the helicopter, such that several magazines will cover a larger firing range. It would in some situations also be possible to steer the helicopter such that a desired firing direction of a countermeasure is obtained.

However, in some situations, a magazine may be directed in a direction that is not usable for a specific situation.

The known solutions will in some situations allow for firing a countermeasure in a desired direction. Even though these arrangements may give an acceptable result in some cases, there is room for improvements.

BRIEF SUMMARY

One object of the present invention is to at least partially eliminate the drawbacks associated with the solutions known in the prior art. Another object is to provide a magazine in which the launch angle can be selected. Another object of the invention is to provide an aircraft comprising such a magazine.

The solution to the problem according to the invention is described in the characterizing part of claim 1. Claim 14 refers to an advantageous method for launching a countermeasure. The other claims contain advantageous embodiments and further developments of the magazine and the method.

In a magazine for storing and launching countermeasures arranged in cartridges, comprising a plurality of longitudinal cartridge cases forming the magazine, where each cartridge case comprises side walls and a front opening and a centre axis, the object of the invention is achieved in that the side walls of two adjacent cartridge cases are arranged to each other in a slidable manner in a longitudinal direction, and where the magazine comprises a tilting means adapted to tilt the cartridge cases, such that the openings of the cartridge cases can be directed in a selected direction.

By this first embodiment of the magazine according to the invention, a magazine is provided, in which the cartridge cases of the magazine can be tilted with a selected angle in a desired direction, in which the countermeasure is to be launched. When mounted on an aircraft, the selected angle depends on the direction of motion of the aircraft and on the relative azimuth and elevation angle to an incoming threat. When mounted on a vehicle or on the ground, the selected angle depends on the direction to an incoming threat. In this way, it is also possible to tilt the cartridge cases to a resting position in which the cartridge cases are directed in a predefined direction, e.g. away from an entrance opening of a helicopter. The resting position may also be a position in which the cartridge cases are directed such that there is no acoustic noise induced by one or more open cavities of a cartridge. The resting position may also be a position in which the cartridge cases are arranged in the centre of the tilting mechanism, or in a predefined direction which is believed to be the "best choice" for launching a countermeasure. For an aeroplane, the cartridge cases are preferably tilted somewhat backwards in order to minimize induced noise and vibrations. For a helicopter, the resting position may e.g. be directed outwards and sideways. A helicopter may e.g. carry more than one and up to four magazines or more magazines, e.g. one at each corner, where the magazines may use the same or different resting positions.

It is also possible to use a system for launching countermeasures on ground comprising one or more variable magazines, which may be either mounted on a vehicle or mounted in a fixed way on ground. In a resting position for ground use, the cartridge cases are preferably tilted in a direction towards an enemy and away from the own troops.

A countermeasure is in these examples an expendable measure that is ejected from the magazine of an active protection system. It may be of a soft-kill type, such as a flare or chaff, or of a hard-kill type, such as a grenade or a short-range missile.

When a countermeasure is to be launched in a selected direction, the cartridge cases are tilted to an active position, pointing in the desired launch direction. The preferred launch direction for a helicopter depends of the incoming threat, but is often to the rear of the helicopter. It is however of advantage to be able to direct the cartridge cases in a sideway direction or in a forward direction, since a helicopter may hover or may fly in any direction. There are of course limitations for the possible tilting angle, but it is preferred that a cartridge case can be tilted in a first direction both forwards and rearwards by at least 45 degrees. Further, it is of advantage that a cartridge case can be tilted in a second direction both forwards and rearwards by at least 45 degrees. For a ground use, the preferred launch direction may e.g. be determined by sensors adapted to detect motion in the surroundings. Such a sensor may be a radar or a vision system.

The magazine is operated and tilted by one or more actuators, which are controlled by an electronic control unit. In one example, an input signal to the electronic control unit may be a direction signal, which gives a desired pointing direction for a cartridge. The direction signal may e.g. be obtained from a radar system in the aircraft. The input signal may also take account of the actual flight direction of the aircraft, such that the launch angle of a countermeasure can be adapted to the actual elevation and azimuth of the aircraft, especially if the aircraft flies with a relatively high speed.

The cartridge cases are arranged adjacent each other in a slidably manner, such that the cartridge cases may be tilted. In this way, the openings of the cartridges can be directed in a selected direction. The cartridge cases are adapted to be tilted in a first forward direction and a first backward direction. They may also be adapted to be tilted in a second forward and rearward direction. The cartridge cases comprises in one example longitudinal interconnection means arranged in parallel with the centre axis, where adjacent cartridge cases are interconnected to each other in a slidable manner. The interconnection means may e.g. comprise longitudinal grooves and tongues interconnecting adjacent cartridge cases. The interconnection means may also comprise longitudinal grooves and rivet heads adapted to run in the grooves.

A cartridge case is advantageously provided with a square or rectangular cross-section. In this case, the interconnection means preferably extend on a plurality of the longitudinal external sides of the cartridge case. A cartridge case could also be provided with another cross-sectional shape, for example a round or polygonal shape. Depending on the cross-sectional shape, the interconnection means preferably extend on at least one external side of each cartridge case such that adjacent cartridge cases can be interconnected to each other.

The cartridge cases of a magazine are arranged to be tilted by a tilting means in a selected angle, e.g. with reference to the direction of motion of the aircraft or with reference to the mounting position of the magazine, such that the openings of the cartridges can be directed in the selected direction. The cartridge cases are adapted to be tilted from a first position to a second position. The first position may e.g. be a resting position and the second position may be an active position. In this description, the directions will be defined as follows, where directions relating to a helicopter are used. The forward direction of the aircraft is approximated as a direction with the nose pointing forwards, and being in the horizontal plane, i.e. floor and the rotor of the helicopter are parallel to the horizontal plane.

The resting position is typically a position in which the cartridge cases are directed in a first predefined direction. This position preferably represents a most likely launch direction for a countermeasure, such that a countermeasure can be launched without having to tilt the cartridge cases. The resting position may also be the centre position of the tilting means, which may be a position in which the cartridge cases are perpendicular to a base plate of the magazine.

The active position is the launch position. In the launch position, the cartridge cases are directed in any possible direction, e.g. between 0-45 degrees forwards or backwards in the first direction and between 0-45 degrees forwards or backwards in the second direction. Hence, the cartridge cases of the magazine may be adapted to tilt from a resting position to an active position before a countermeasure is fired and to tilt back to the resting position after the countermeasure is fired. The cartridge cases may also tilt from a first launch position to a second launch position.

According to one aspect, the tilting means are preferably attached to a single tilt control cartridge case of the magazine. This tilt control cartridge case is preferably a cartridge case arranged in the centre of the magazine, but it is possible to use any position in the magazine for the tilt control cartridge case. The tilting means will tilt the tilt control cartridge case and the other cartridge cases, being slidable attached to each other, will follow the tilt control cartridge case and will thus be tilted by the same amount. The tilting means may e.g. comprise a bar positioned at a distance from a hinge-point. The bar interconnects the tilt control cartridge case with an actuating means. The actuating means may be arranged in the base plate. It is e.g. possible to let a cartridge case extend downwards with a pin that interacts with an actuating means in the base plate.

The invention also relates to a method for launching a countermeasure from a magazine. The countermeasure is arranged in a cartridge case comprised in the magazine. The method comprises the steps of: tilting the cartridge case from a resting position to an active position, launching the countermeasure, and tilting the cartridge case back to the resting position.

BRIEF DESCRIPTION OF THE FIGURES

The invention will be described in greater detail in the following, with reference to the embodiments that are shown in the attached drawings, in which FIG. 1 schematically shows a side view of an aircraft provided with magazines according to an embodiment of the invention for storing and launching countermeasures, FIG. 2 schematically shows a side view of a magazine in a resting position according to the invention, FIG. 3 schematically shows a side view of a magazine in an active position according to the invention, FIG. 4 schematically shows an example of a magazine according to the invention in an ISO view, FIG. 5 schematically shows a front view of a part of a magazine according to the invention, and FIG. 6 schematically shows an example of an interconnecting means used in a magazine according to the invention.

DETAILED DESCRIPTION OF VARIOUS EMBODIMENTS

The embodiments of the invention with further developments described in the following are to be regarded only as examples and are in no way to limit the scope of the protection provided by the patent claims. References such as longitudinal, horizontal, vertical, forward, rearward, sideway, etc. refer to directions of an aircraft flying forwards in a normal orientation. For a magazine used on ground, directions may also be referred to as forward, rearward, sideway, left, right, etc.

Figure 1:
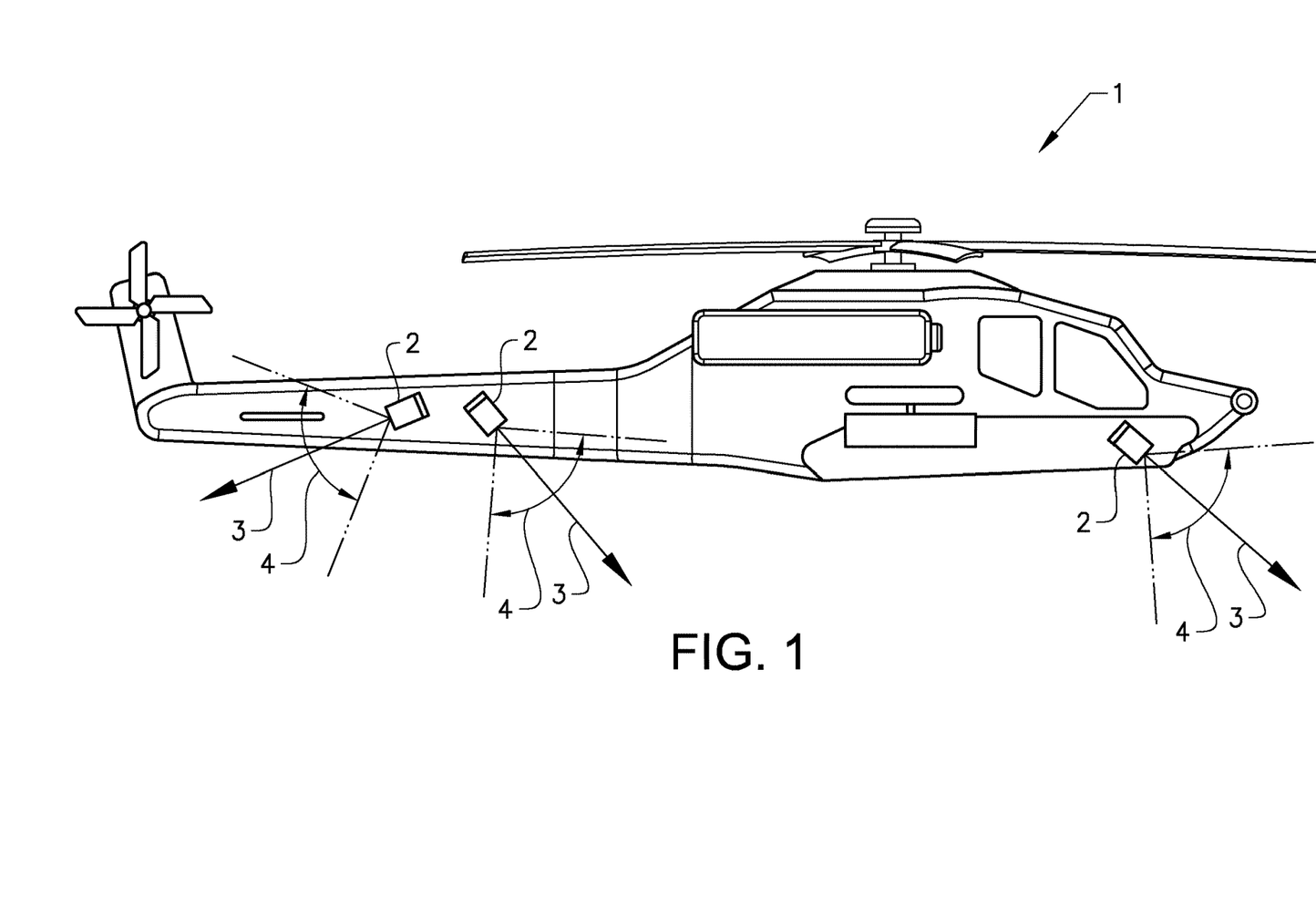

An aircraft 1 in the form of a helicopter, shown in FIG. 1, is provided with several magazines 2 for storing and launching payloads, hereinafter described as countermeasures 5. The magazine 2 comprises a plurality of cartridge cases 6, see FIG. 2, which are longitudinal and where a cartridge case is adapted to store and launch a countermeasure. An arrow 3 designates the direction of launching from a magazine 2. The possible launch sector is denoted with 4. In the example shown in FIG. 1, one side of a helicopter is shown. On this side, one magazine 2 is placed at the front of the helicopter, pointing substantially forwards-downwards, and two magazines 2 are placed at the rear of the helicopter, where one magazine point forwards-downwards and one magazine point rearwards-downwards.

Since the helicopter may hover or may fly upwards, downwards, forwards or sideways and with varying speeds, the desired launch direction will depend on the actual flight direction of the helicopter as well as on the relative azimuth and elevation angle to an incoming threat. The launch direction will also depend on the actual mounting position on the helicopter. Preferably, several magazines are mounted in different positions on a helicopter in order to cover different launch directions. In this way, it will be possible to launch countermeasures in most directions from the helicopter, such that the flight direction of the helicopter is not important in order to direct the countermeasure to a desired position.

The magazine 2 is described in more detail with reference to FIG. 2 and FIG. 3. FIG. 4 shows an isometric view of the magazine shown in FIG. 2. In one example, the described magazine is adapted to be used on an aircraft and in the described example, a helicopter is used as an example of an aircraft. The magazine may also be used on ground, and may be mounted on a vehicle such as a landing craft, a truck or a battle tank, or may be mounted in a fixed position on the ground, e.g. by the use of a stand or a tripod. The magazine is preferably directed in a main direction from which the magazine can be tilted to a desired direction, e.g. when a moving object has been detected. In this way, one or a few magazine can be used to cover a large area. By tilting the magazine also in a vertical direction, the elevation angle of a countermeasure can also be controlled.

The magazine 2 comprises a plurality of cartridge cases 6 arranged in a matrix with a number of rows and a number of columns. A suitable number of rows may e.g. be 4-8 and a suitable number of columns may e.g. be 5-12, depending on the size of a cartridge. A cartridge case is designed with a longitudinal body, preferably having a square or rectangular cross-section. The cross-section of a cartridge may e.g. be 1*1 or 1*2 inches and the length may e.g. be 8 inches. A cartridge case is adapted to receive a countermeasure 5 stored in a cartridge 12. The countermeasure cartridge 12 is attached to the cartridge case in a known way. The countermeasure cartridge 12 is further connected to a launch system of the aircraft, comprising a firing control. The interface between the countermeasure cartridge and the electronic control unit of the aircraft may be a mechanical system, which can only launch the countermeasure, or it may be an electrical interface, comprising two way communication between the countermeasure cartridge and the aircraft.

The magazine 2 comprises a base 7, which is the base of the magazine and is used to mount the magazine to e.g. an aircraft by the use of an attachment means. The magazine may be mounted directly to an attachment bracket on the aircraft with suitable mounting means. It is also possible to mount the magazine to an adapter bracket, which is used to create an interface for an existing mounting bracket on an aircraft. By using a suitable adapter bracket, the magazine can be mounted to an aircraft provided with standardized mounting brackets for fixed magazines. In this way, there is no need to upgrade the aircraft with new mounting brackets. Further, by using an adapter bracket, both fixed magazines and variable magazines can be used, depending on the actual needs. The base is used to mount the magazine to an aircraft. The base is also used to absorb recoil forces created when a countermeasure is launched. The base will absorb and distribute the created force over the entire base area of the base.

Each cartridge case 6 is attached to the base 7 through a flexible joint 16. For a magazine in which the cartridge cases can be tilted in two directions, a flexible joint which allows pivoting of the cartridge cases in two directions is used, such as a ball joint. If the cartridge cases should only tilt in one direction, the flexible joint may be a hinge. A ball joint allows the cartridge cases to be tilted in any direction. Each cartridge case is provided with a flexible joint. At the bottom of each cartridge case, a recoil plate 8 is arranged which is used to attach each cartridge case to the base through the flexible joint. The recoil plate will also transfer the recoil force from a countermeasure to the base when a countermeasure is launched. A cartridge case 6 is attached to a recoil plate 8 in a removable way, such that a countermeasure cartridge 12 can be inserted in the cartridge case. Since the cartridge cases are interconnected to each other to form the magazine, it is possible that all cartridge cases are removed at the same time as one unit when countermeasure cartridges are to be replaced. The flexible joint of one cartridge case will be arranged at a fixed position and will be mounted to the base in a fixed way. This cartridge case will be referred to as the tilt control cartridge case 17. This cartridge case is preferably arranged at the centre of the magazine, but it may also be arranged at a side or at a corner of the magazine. This cartridge case will be provided with a tilting means 25 which will tilt the magazine in a desired direction. In the shown example the tilt control cartridge case is arranged as a centre cartridge case.

A cartridge case 6 comprises a cavity 13, adapted to store the countermeasure cartridge 12 and is provided with an opening 14 at the front of the cartridge case. The countermeasure cartridges 12 are connected to a launching control unit (not shown) for feeding launching signals to the countermeasure cartridges. When a countermeasure has been launched, the countermeasure cartridge can be replaced with a new countermeasure cartridge by removing the remains of the launched countermeasure cartridge from the cartridge case and by inserting a new countermeasure cartridge into the cartridge case.

The base 7 of the magazine is in the shown example further provided with a first rail 18 arranged along the z-axis and which is provided with a dovetail shape. The first rail is fixedly mounted to the base. The first rail intersects with the flexible joint of the tilt control cartridge case 17. The base is further provided with a fixed second rail 19, which is arranged along the x-axis. The fixed second rail intersects the flexible joint of the tilt control cartridge case 17 and is perpendicular to the first rail 18.

The first rail is adapted to hold several movable third rails 32 which are arranged along the x-axis, parallel to the fixed second rail 19. The movable third rails are in this example provided with a groove having a dovetail shape. The movable third rails 32 are adapted to glide on the first fixed rail and the movable third rails are thus provided with a dovetail shaped cut out adapted to cooperate with the dovetail of the first rail. It is also possible to use several spaced apart first fixed rails in order to increase the stability and precision of the magazine.

Each flexible joint is provided with a sliding block 20 attached to the flexible joint in a fixed manner. The sliding block is provided with a dovetail shape adapted to cooperate with the dovetail shaped grooves of the second rail 19 and the movable third rails 32. The movable third rails and the sliding blocks allow the distance between two flexible joints to vary. When the cartridge cases are tilted, the flexible joints that are not arranged along the first fixed rail or the fixed second rail, depending on the tilt direction, will have to move slightly away from the tilt control cartridge case 17 due to the relative geometric change between the cartridge cases. The movable third rails and the sliding blocks allow this movement. The dovetail shape of the first rail, the cut out of the third rails, the grooves of the second rail and the third rails and the sliding blocks will at the same time secure that the flexible joints are attached to the base. Depending on the required tilt angle for the magazine, it would e.g. also be possible to attach each flexible joint to the base with a resilient means such as rubber. It is important that the flexible joints bear against the base, since the recoil force from the recoil plate is transferred through the flexible joint to the base. Other interconnecting methods are also possible.

Figure 2:
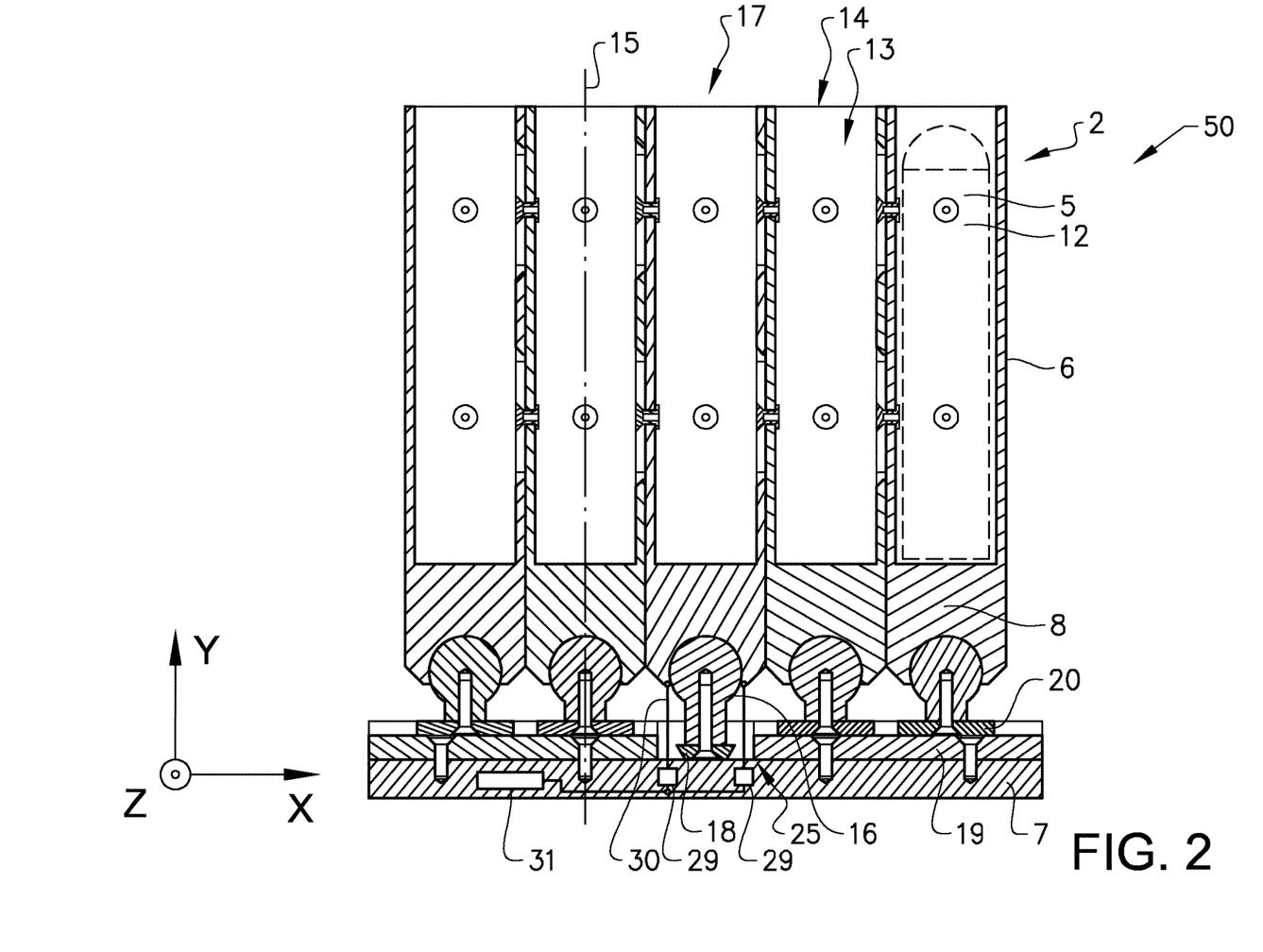

A magazine positioned in a resting or idle position 50 is shown in FIG. 2 and in FIG. 4. In this position, the centre axis 15 of a cartridge case is perpendicular to the base 7. This position is used as a reference position in this description. The tilt angle is zero degrees in the resting position and the centre axis is directed along the y-axis. The recoil base is directed in an x-z plane. The cartridge cases are arranged slidably to each other such that they bear against each other and such that they can slide against each other in the longitudinal direction.

Figure 3:
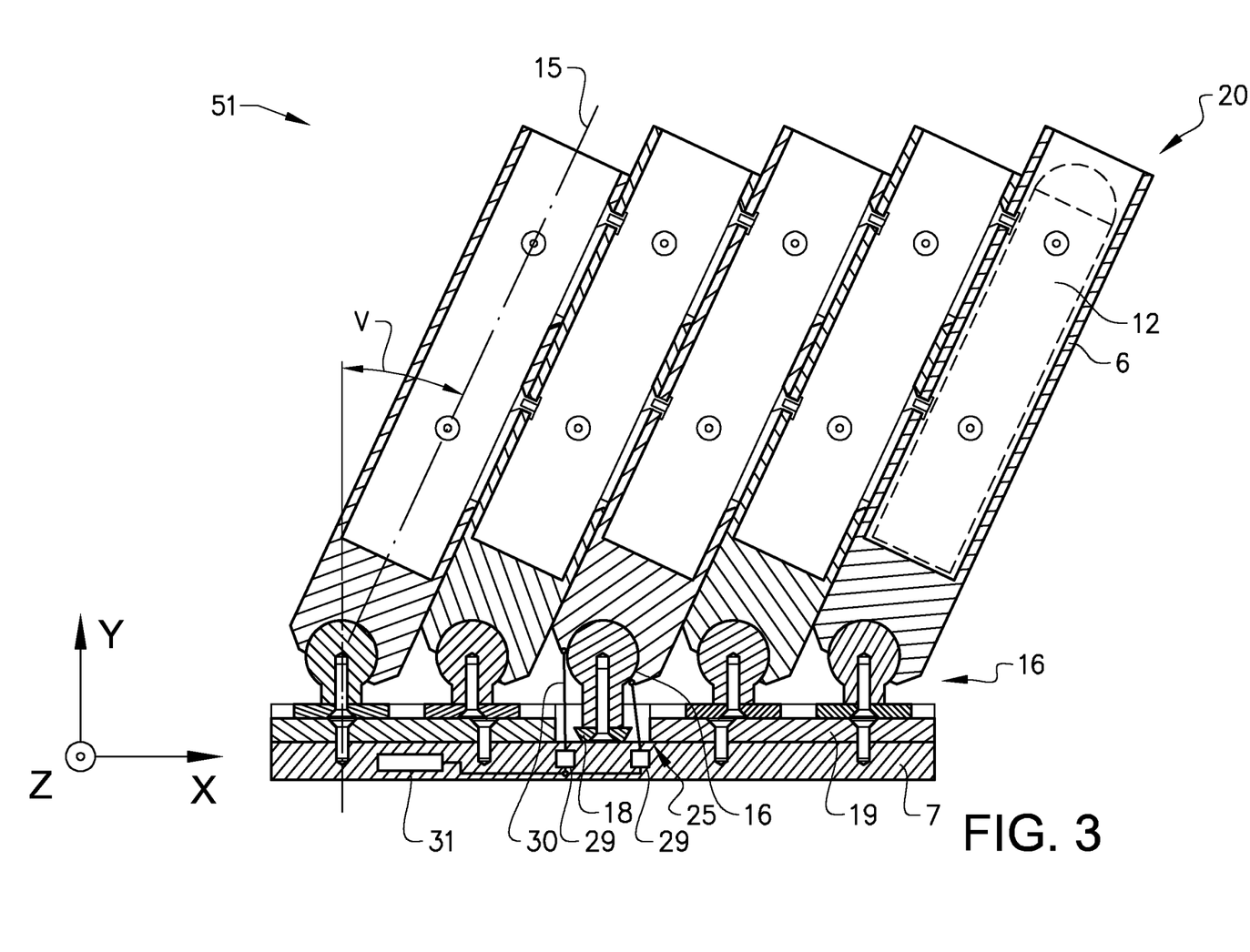
Figure 4:
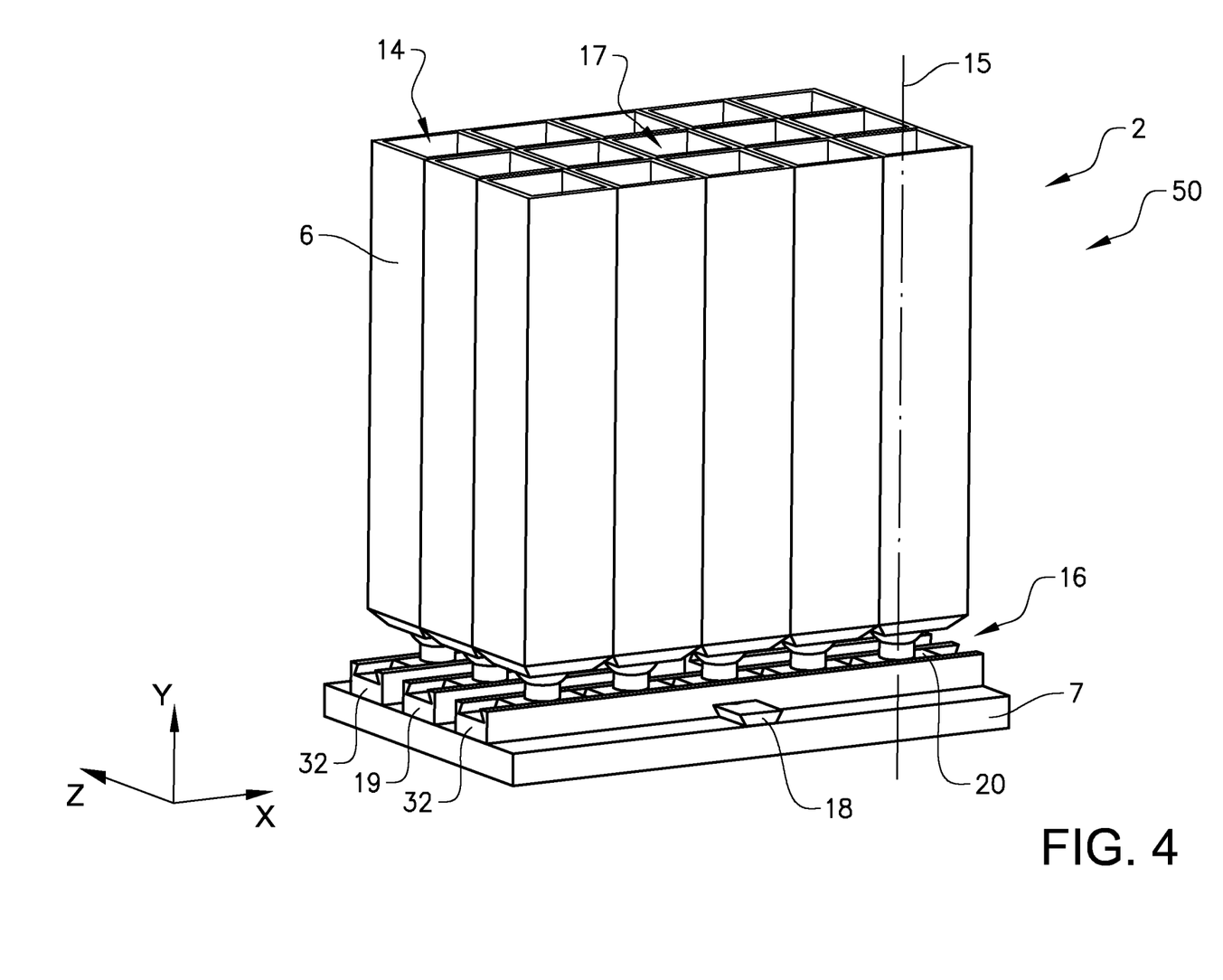

The cartridge cases of the magazine are adapted to be tilted from the resting position 50, shown in FIG. 2, to an active position 51, shown in FIG. 3. Since adjacent cartridge cases are arranged to each other in a slidable manner, the magazine can be tilted by a tilting means to a selected angle. In the description, the selected tilt angle will be relative the resting position. When mounted on an aircraft, the selected angle is preferably referenced to a horizontal and vertical direction of the aircraft, such that the openings of the cartridge cases can be directed in the desired direction.

In FIG. 3, the magazine 2 is in an active position 51 with the cartridge cases inclined in a first direction. As shown in FIG. 3, the distance between the flexible joints has increased some compared to the resting position. The first direction is directed along the x-axis and the second direction is directed along the z-axis. The y-axis is parallel to the centre axis 15 of a cartridge case when positioned in the resting position. The inclination angle v is chosen depending on the intended use of a countermeasure and the active position may e.g. be directing the cartridges between plus and minus 30 degrees, and preferably between plus and minus 45 degrees in a first direction along the x-axis. In the active position, the cartridge cases may also be directed in a second direction along the z-axis, also by e.g. plus and minus 30 degrees, and preferably by plus and minus 45 degrees.

Figure 5:
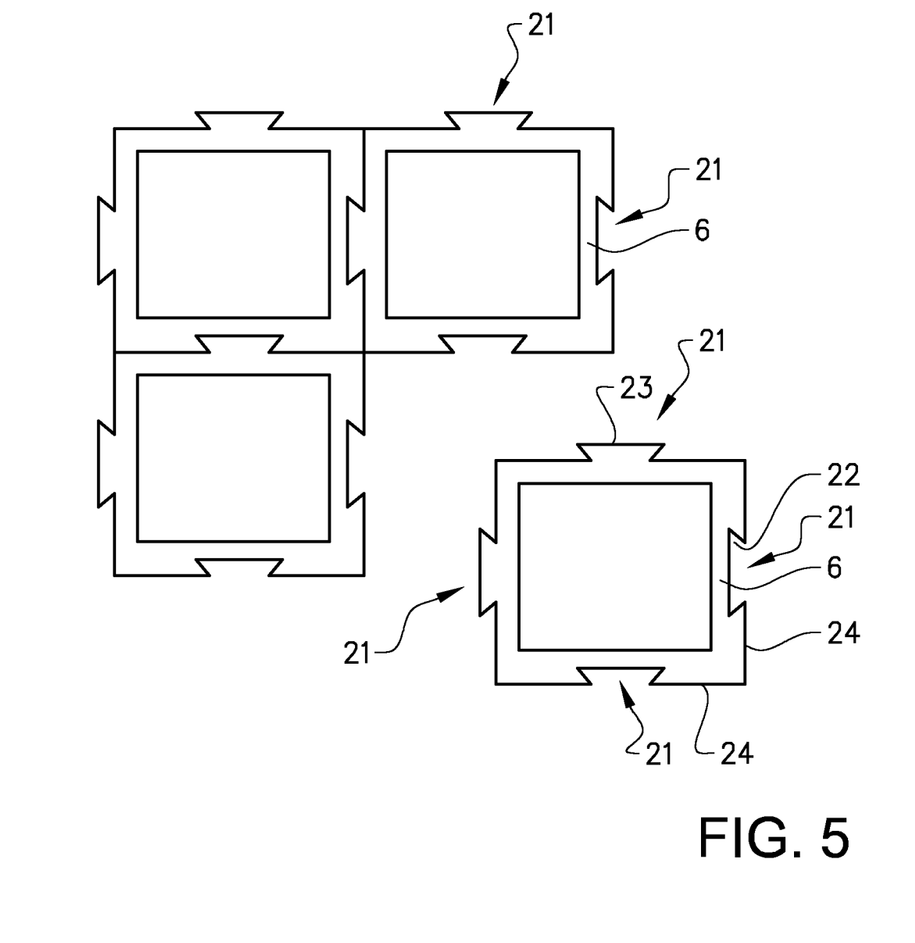

FIG. 5 schematically shows an example of a top view of a part of a magazine according to the invention. In the example shown in FIG. 5, each cartridge case 6 comprises longitudinal interconnection means 21 arranged in parallel with the centre axis 15 of the cartridge case, where adjacent cartridge cases 6 are interconnected to each other in a slidable manner by the interconnection means 21. In FIG. 5, the interconnection means 21 comprises longitudinal grooves 22 and tongues 23. In this example, the cartridge case 6 has a square cross-section and the interconnection means 21 extend on all four longitudinal external sides 24 of a cartridge case. The cartridge case may also have a different cross-sectional shape, for example rectangular, round or polygonal. Dependent on the cross-sectional shape, the interconnection means extend on at least one external side of each cartridge such that adjacent cartridges can be interconnected.

The cartridge cases may also be provided with T-shaped grooves with a nut interconnecting two adjacent cartridge cases. Other types of grooves are also possible. All cartridge cases must not be interconnected to each other. It is e.g. sufficient to interconnect only the outer cartridge cases of a magazine with each other, such that the shape of the magazine is preserved. The inner cartridge cases may in this case only bear against each other. In order to minimize vibrations and to take up tolerances, it is advantageous to mount a leaf spring in e.g. a groove, which will push two adjacent cartridge cases apart, such that the interconnecting means will always be in contact.

Figure 6:
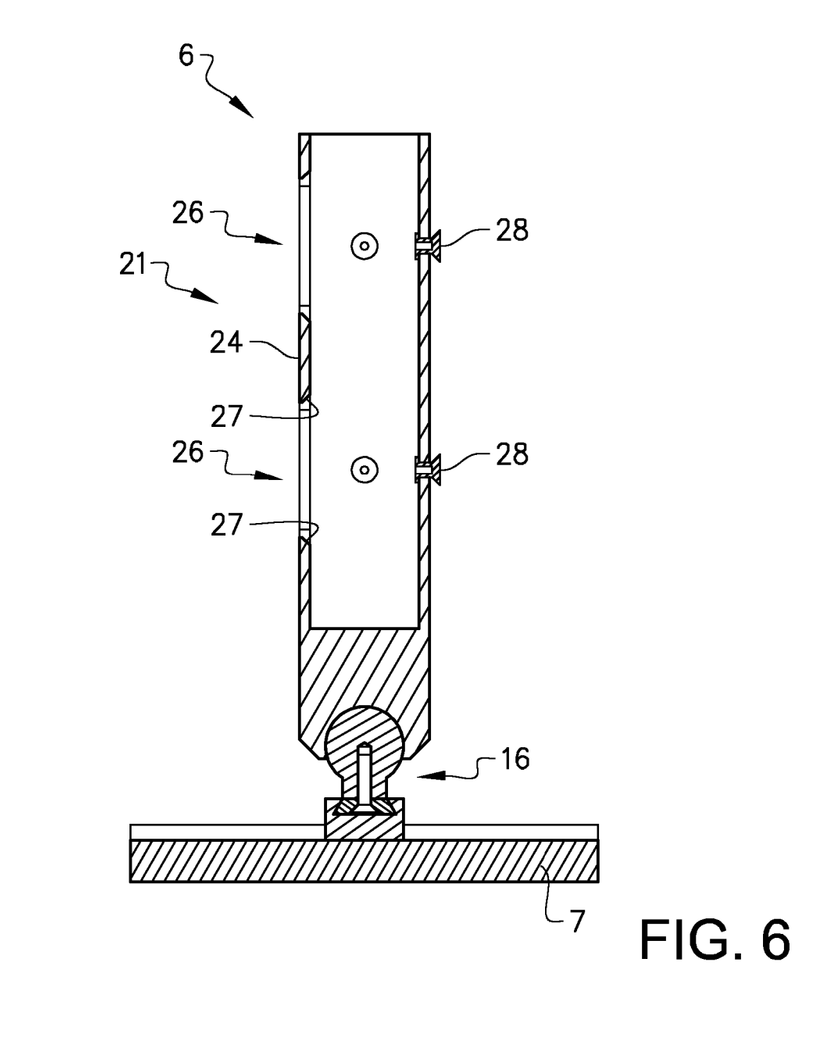

FIG. 6 shows another example of an interconnecting means for two adjacent cartridge cases. In this example, one cartridge case 6 is provided with two longitudinal slits 26 having tapered edges 27. An adjacent cartridge case is provided with two tapered rivets 28, adapted to be able to slide in the slits. With two sides of a cartridge case having slits, and two sides having rivets, a magazine can be obtained by interconnecting a plurality of cartridge cases. The sides of the cartridge cases that will provide the outer sides of the magazine are preferably not provided with slits or rivets.

In order to provide an interconnection between two cartridge cases without play, it is possible to position a longitudinal leaf spring between the cartridge cases, e.g. in the slit or groove or at the external sides. The leaf spring will compensate for tolerances and will prohibit vibrations and vibrating noise.

FIG. 2 schematically shows an example of a side view of a magazine in a resting position according to the invention, and FIG. 3 schematically shows a side view of a magazine in an active position according to the invention. The magazine 2 comprises a tilting means 25 adapted to tilt the cartridge cases of the magazine in a selected direction. The tilting means is in this example arranged at a central cartridge case which is the tilt control cartridge case 17, and will only be attached to the tilt control cartridge case. Since all cartridge cases bear against each other, all cartridge cases will be tilted when the titling means tilts the tilt control cartridge case. The tilting means is in the shown example arranged inside the base 7 and comprises, for tilting the magazine in one direction, one or two actuating means 29 which is connected to the recoil plate 8 of the tilt control cartridge case via one or two intermediate connections 30 The tilting means 25 comprises one fixed hinge-point which is the ball joint of the tilt control cartridge case. The tilting means 25 comprises in the shown example two actuating means 29 arranged to displace the cartridge case in a first direction, such that the cartridge cases tilt with respect to the ball joint of the tilt control cartridge case. The actuating means 29 are controlled by an electronic control unit 31 e.g. arranged in the base. The electronic control unit receives information regarding the desired tilt angle and controls the actuating means such that the cartridge cases are directed in the desired direction. The desired tilt angle is received from e.g. the control system of the aircraft or from an integrated tracking system. The intermediate connections 30 are in the shown example wires, where one wire is pulled by one actuator 29 in order to tilt the magazine in the desired direction. The other actuator will at the same time release the other wire by the same amount, such that the magazine is tilted in a reliable way. By preloading the wires, the tilting means will be without play. It is also possible to use e.g. one push/pull rod instead of two wires for tilting the magazine in one direction. The tilting means for the other direction acts in the same way.

Other tilting means are also possible, depending on the size and weight of a cartridge case. The actuating means 29 may be e.g. a motor acting on a toothed rail or a linear electrical cylinder. The tilting means may e.g. be connected to the tilt control cartridge case by wires or push/pull rods.

The invention is not to be regarded as being limited to the embodiments described above, a number of additional variants and modifications being possible within the scope of the subsequent patent claims. The cartridges may be arranged adjacent each other in different ways and may be tilted with different means. The magazine may be mounted to both moving vehicles of all kinds and may also be mounted in a stationary manner, either fixed on e.g. a building or on a movable stand.

REFERENCE SIGNS

1: Aircraft
2: Magazine
3: Direction of launch
4: Launch sector
5: Countermeasure
6: Cartridge case
7: Base
8: Recoil plate
10: Ball joint
12: Cartridge
13: Cavity
14: Opening
15: Centre axis
16: Flexible joint
17: Tilt control cartridge case
18: First rail
19: Second rail
20: Sliding block
21: Interconnecting means
22: Longitudinal groove
23: Tongue
24: Longitudinal external side
25: Tilting means
26: Slit
27: Tapered edge
28: Rivet
29: Actuating means
30: Intermediate connection
31: Electronic control unit
32: Third rail
50: Resting position
51: Active position

The invention claimed is:

1. A magazine (2) for storing and launching countermeasures (5) arranged in cartridges (12), the magazine (2) comprising:
a plurality of longitudinal cartridge cases (6) forming the magazine (2), wherein each cartridge case (6) comprises side walls and a front opening (14) and a center axis (15), and the side walls (24) of two adjacent cartridge cases (6) are arranged to each other in a slidable manner in a longitudinal direction, and
a tilting means (25) configured to tilt the cartridge cases (6), such that the openings (14) of the cartridge cases (6) are selectively oriented in a selected direction.

2. The magazine according to claim 1, wherein:
each of the cartridge cases (6) comprises longitudinal interconnection means (21) arranged in parallel with the center axis (15), and
adjacent ones of the cartridge cases (6) are interconnected to each other in a slidable manner by the interconnection means (21).

3. The magazine according to claim 2, wherein the interconnection means (21) comprises longitudinal grooves (22) and tongues (23).

4. The magazine according to claim 3, wherein the interconnection means (21) extend on a plurality of longitudinal external sides (24) of each of the cartridge cases (6).

5. The magazine according to claim 4, wherein the magazine comprises a base (7) to which the cartridge cases (6) are hingedly attached.

6. The magazine according to claim 5, wherein the tilting means (25) is connected to a tilt control cartridge case (17) of the magazine.

7. The magazine according to claim 6, wherein each of the cartridge cases (6) is attached to the base (7) by a flexible joint (16).

8. The magazine according to claim 7, wherein the flexible joint (16) of each of the cartridge cases (6) except the tilt control cartridge case (17) are movable in a first and in a second direction when the magazine (2) is tilted.

9. The magazine according to claim 8, wherein each of the cartridge cases (6) are configured to be tilted from a resting position (50) to an active position (51).

10. The magazine according to claim 9, wherein each of the cartridge cases (6) are configured to be tilted at least by 30 degrees in a first direction.

11. The magazine according to claim 10, wherein each of the cartridge cases (12) are further configured to be tilted at least by 30 degrees in a second direction.

12. The magazine according to claim 1, wherein:
the magazine (2) is configured to tilt from a resting position (50) to an active position (51) before a countermeasure is launched, and
the magazine (2) is configured to tilt back to the resting position (50) after the countermeasure has been launched.

13. The magazine according to claim 1, wherein the magazine (2) is configured to be mounted on an aircraft (1).

14. A method for launching countermeasures (5) from the magazine (2) of claim 1, the method comprising steps of:
tilting the cartridge cases (6) from a resting position (50) to an active position (51) such that the openings (14) of the cartridge cases are oriented in the selected direction and launching at least one of the countermeasures (5) when the cartridge cases (6) are in the active position (51) with the openings (14) oriented in the selected direction.

15. An aircraft comprising at least one magazine according to claim 1.

\* \* \* \* \*

UNITED STATES PATENT AND TRADEMARK OFFICE
CERTIFICATE OF CORRECTION

| | | |
|---|---|---|
| PATENT NO. | : 10,683,092 B2 | Page 1 of 1 |
| APPLICATION NO. | : 16/301305 | |
| DATED | : June 16, 2020 | |
| INVENTOR(S) | : Christer Zaetterqvist | |

It is certified that error appears in the above-identified patent and that said Letters Patent is hereby corrected as shown below:

In the Claims

Column 10, Claim 14, Line 61:
"comprising steps of" should read --comprising the steps of--

Signed and Sealed this
Twenty-third Day of February, 2021

Drew Hirshfeld
*Performing the Functions and Duties of the*
*Under Secretary of Commerce for Intellectual Property and*
*Director of the United States Patent and Trademark Office*